(12) United States Patent
Cherian

(10) Patent No.: US 12,474,699 B2
(45) Date of Patent: Nov. 18, 2025

(54) SYSTEM AND METHOD FOR ANOMALY DETECTION USING AN ATTENTION MODEL

(71) Applicant: Anoop Cherian, Belmont, MA (US)

(72) Inventor: Anoop Cherian, Belmont, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 489 days.

(21) Appl. No.: 18/154,206

(22) Filed: Jan. 13, 2023

(65) Prior Publication Data

US 2024/0241508 A1    Jul. 18, 2024

(51) Int. Cl.
 *G05B 23/02* (2006.01)

(52) U.S. Cl.
 CPC .................... *G05B 23/0259* (2013.01)

(58) Field of Classification Search
 None
 See application file for complete search history.

(56) References Cited

U.S. PATENT DOCUMENTS

| | | | |
|---|---|---|---|
| 11,301,563 B2 * | 4/2022 | Huang | G06N 3/044 |
| 2019/0034497 A1 * | 1/2019 | Song | G06F 16/9014 |
| 2020/0026965 A1 * | 1/2020 | Guo | G06N 3/044 |
| 2020/0337648 A1 * | 10/2020 | Saripalli | G06N 20/00 |
| 2024/0211734 A1 * | 6/2024 | Rohwer | G06N 3/088 |

OTHER PUBLICATIONS

Brown et al. 'Recurrent Neural Network Attention Mechanisms for Interpretable System Log Anomaly Detection' Proceedings of the first workshop on machine learning for computing systems Jun. 12, 2018 (pp. 1-8), published 2018.*

* cited by examiner

*Primary Examiner* — Bernard G Lindsay
(74) *Attorney, Agent, or Firm* — Gene Vinokur

(57) ABSTRACT

An anomaly detector for controlling a system is provided. The system comprises one or multiple tools to perform one or multiple tasks. The anomaly detector collects a feedforward signal indicative of a sequence of control inputs to the plurality of actuators and a feedback signal indicative of a sequence of outputs of the system caused by the plurality of actuators operated based on the sequence of control inputs. The anomaly detector further combines input state variables extracted from the feedforward signal and output state variables extracted from the feedback signal to form a sequence of extended states of the system. The attention model further encodes the sequence of extended states to produce an encoding of each extended state of the sequence of extended states in a latent space. The anomaly detector further detects an anomaly in a current operation of the system based on the encoded sequence of extended states.

18 Claims, 12 Drawing Sheets

SYSTEM AND METHOD FOR ANOMALY DETECTION USING AN ATTENTION MODEL

TECHNICAL FIELD

The present invention relates generally to anomaly detection suitable for manufacturing automation, and particularly to anomaly detector and anomaly detection method with attention model.

BACKGROUND

Manufacturing process is a process to convert raw materials into final products with the help of tools, machinery, human labor and the like. The types of a production method in the manufacturing process include a process manufacturing and a discrete manufacturing. In the process manufacturing, products are generally undifferentiated, for example, oil, natural gas, and salt. The discrete manufacturing produces distinct items, e.g., automobiles, furniture, toys, and airplanes. Regardless of the type of the production method, the manufacturing process may include a number of operations that seem to be independent of each other but need to be executed in a synchronous manner with a very tight schedule. For example, in a number of assembly operations, two independent processes need to be performed sequentially or even concurrently with milliseconds of precision to get the effective results.

The precision of the time synchronization of the manufacturing operations can be affected by external and internal disturbances. The external disturbances may come from the versatility of the manufacturing process. For example, a detail to be assembled can be placed in different positions, which can be treated as a disturbance external to the assembly process. Conversely, the assembly of detail at one position can take more time than the assembly of the detail at a different position. This difference can be treated as an internal disturbance that can affect the synchronization of different manufacturing operations.

Further, controlling the performance of the manufacturing process, where fast and powerful machines can execute complex sequences of operations at high speeds is a challenging task. Deviations from an intended sequence of operations or timing of execution of the operations giving rise to anomalies that may degrade quality, waste raw materials, cause downtimes, broken equipment, and decrease output. For these reasons, extreme care must be taken to avoid the anomalies to minimize unexpected events, and also safeguards need to be designed into the production line, using a variety of sensors and emergency switches.

In data analysis for the manufacturing process, anomaly detection is generally understood to be the identification of rare items, events, or observations that deviate from the majority of the data and do not conform to a well-defined notion of normal behavior. Such examples may arouse suspicions of being generated by a different mechanism or appear inconsistent with the remainder of that set of data. Hence, at least in theory, the anomaly detection can be used for identifying unusual behavior indicative of the failure of manufacturing automation. However, the complexity of modern manufacturing automation using joint operations of independent processes makes the anomaly detection based on the individual processes unreliable, and/or too complex for joint anomaly detection.

Accordingly, there is a need for a system and a method for the anomaly detection suitable for controlling the manufacturing automation benefiting from the joint operations of independent processes.

SUMMARY

It is an object of some embodiments to disclose a device and a method suitable for anomaly detection in a manufacturing process of a system. Particularly, it is an object of some embodiments to provide an anomaly detector and an anomaly detection method for anomaly detection with an attention model. The system may include multiple manufacturing operations in which the anomaly may be detected in the presence of external and internal disturbances to the system. Examples of the manufacturing operations include an assembly operation performed by synchronized actions of different robotic manipulators, moving an object through a sequence of locations, machining a workpiece by different tools in a predetermined sequential or partially overlapping order, and a combination thereof.

Some embodiments are based on the realization that to make the anomaly detection resilient to the presence of external and internal disturbances in the system, the state of the system to be analyzed for the anomaly detection needs to be extended to both the control inputs to actuators of the system and the state of the system caused by the control inputs.

Some embodiments are based on the realization that the different nature of state variables of such an extended state poses challenges to the practicability of the anomaly detection. For example, the state variables associated with the control inputs to the actuators can be values of physical entities such as voltages, current, tension, viscosity, resistance, valve openings, etc., the state variables of an output of the system caused by the control inputs can be values of position, orientation, sound, friction, vibration, pressure, etc.

Some embodiments are based on the realization that in the system that includes a modern manufacturing automation process, the extended state may have hundreds or thousands of different state variables. The number and the different nature of these state variables make various anomaly detection methods, such as anomaly detection based on autoencoder reconstruction, generalize beyond the input distribution, thereby making these anomaly detection methods suboptimal.

It is an object of some embodiments to address the dimensionality and versatility problem of different state variables of the control inputs and the outputs of the system for the anomaly detection using an attention model. In general, the attention model which are based on an attention mechanism, are input processing techniques for neural networks that allow a network to focus on specific aspects of a complex input, one at a time until the entire dataset is categorized. The objective of the attention mechanism is to break down complicated tasks into smaller areas of attention that are processed sequentially.

The attention is expressed as a function that maps a query and "a set" of key-value pairs to an output. Typically, the query, keys, values, and final output are all vectors. The output is then calculated as a weighted sum of the values, with the weight assigned to each value expressed by a compatibility function of the query with a set of keys.

Some embodiments disclose determination of a set of exemplars to be used as keys in the attention model. Each exemplar defines an extended state of a normal operation of the system for which the anomaly detection is designed.

Each exemplar is a vector, and each element of the vector is a value and/or another vector with values of the corresponding state variables. The set of exemplars is defined in advance to represent different distinctive examples of the extended state for the normal operation i.e., non-anomalous performance of a manufacturing process of the system.

Some embodiments disclose that a set of first values is designed for the set of keys by embedding each key of the set of keys into a low-dimensional space. Hence, a first value of the set of first values is an embedding of a corresponding key of the set of keys with the dimension lower than the dimension of the extended state of the manufacturing process of the system. Such an embedding can be done offline, for example, during a training of the attention model with the help of the encoding neural network.

Some embodiments disclose a query in the attention model defines an extended state of the manufacturing process at each of a plurality of control steps of a current operation of the system. Hence, the set of queries is a time-series data that represents a sequence of extended states of the current operation of the system. A first query of the set of queries may be compared with a first key of the set of keys for a first control step of the plurality of control steps. In such a manner, the extended state at each control step is mapped to an embedded space or a latent space of the normal operation of the manufacturing.

Some embodiments disclose that a feedforward signal indicative of a sequence of control inputs to a plurality of actuators of the system and a feedback signal indicative of a sequence of outputs of the system caused by the plurality of actuators operated based on the sequence of control inputs at a plurality of control steps are collected. Input state variables extracted from the feedforward signal and output state variables extracted from the feedback signal are combined to form the sequence of extended states associated with the current operation of the system. Then, the sequence of extended states are transmitted to the attention model as a set of queries. The set of queries is compared with the set of keys to determine a plurality of attention weights used to weigh corresponding first values of a set of first values. Each key of the set of keys correspond to the respective first value of the set of first values. A metric of comparison of the set of queries and the set of keys is done based on the comparison of corresponding state variables with statistically learned metrics. Such comparison allows adopting the anomaly detection to the different manufacturing processes.

Some embodiments disclose that each of the set of queries is encoded as a weighted corresponding first value of the set of first values weighted with a corresponding attention weight of the plurality of attention weights to produce an encoding of each extended state of the sequence of extended states in the latent space. Therefore, the set of queries may be represented as a weighted combination of embeddings of the normal operations of the manufacturing process of the system.

Some embodiments disclose that a dictionary can be designed which includes extreme values of the set of the first values that are embedded variables defining a predetermined convex subspace of the normal operation of the system in the latent space. Further, the anomaly in the current operation of the system may be detected when at least one encoded query of the encoded set of queries is outside the predetermined convex subspace of the latent space. Therefore, the attention model transforms the sequence of extended states into the latent space of the normal operations, anomaly detection can be performed in low-dimensional latent space.

Some embodiments are based on the realization that the set of keys and the set of first values may be generated and stored by the anomaly detector during training of the anomaly detector. In such a manner, a memory of the anomaly detector has key-value pair for the anomaly detection for different manufacturing processes.

Some embodiments disclose that the attention model may work based on a multi-headed attention mechanism. In the multi-headed attention mechanism, several independent attention mechanisms can run in parallel, and outputs of the several independent attention mechanisms are concatenated and transformed in the latent space. Through this multi-headed mechanism, the system having different manufacturing processes or different components of the system state can be controlled concurrently.

Some embodiments are based on the realization that a result of the anomaly detection may output to a user-interface. In case, the system includes the manufacturing process in which the tools of the system are handled by human labor manually, the operator can modify the operation of the tool based on the output result and thereby, making the manufacturing process more efficient.

Some embodiments are based on the realization that the anomaly detector can generate control commands based on the result of the anomaly detection and transmit the control commands to the actuators of the system. In such a manner, the actuator's signals which are given to a tool assembly of the system can be modified based on the control commands.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

DETAILED DESCRIPTION

Figure 1:
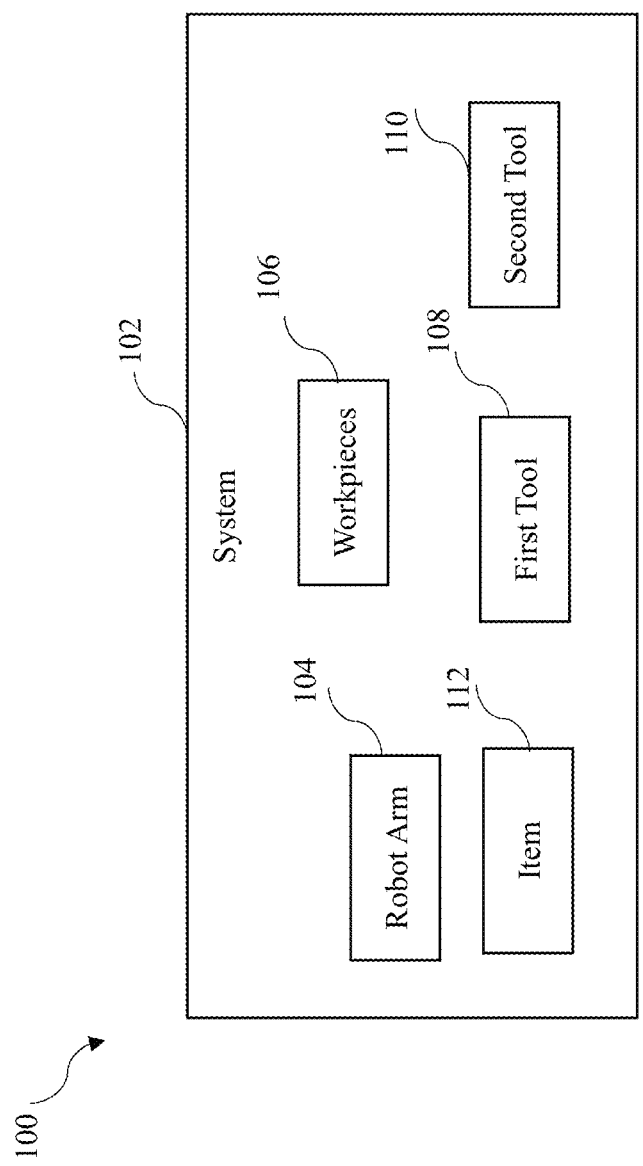
FIG. 1 illustrates a schematic diagram of a system, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

In describing embodiments of the disclosure, the following definitions are applicable throughout the present disclosure.

An "anomaly detector" may be referred to a device or a set of devices to manage, command, direct or regulate the behavior of other devices or systems. The anomaly detector may be implemented by either software or hardware and may include one or several modules. The anomaly detector, including feedback loops, may be implemented using a microprocessor. The anomaly detector may be an embedded system.

An "electrical circuit" refers to an interconnection of wires that transmits electrical signals between components, such as processors, memory, or actuators.

A "computer" refers to any apparatus that is capable of accepting a structured input, processing the structured input according to prescribed rules, and producing results of the processing as output. Examples of a computer include a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer may have a single processor or multiple processors, which m operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It may be implemented by either software or hardware.

A "controller," "control system," and/or "regulator" refer to a device or a set of devices to manage, command, direct or regulate the behavior of other devices or systems. The controller may be implemented by hardware, a processor with operation configured by the software, and combination thereof. The controller may be an embedded system.

FIG. 1 illustrates a schematic diagram 100 of an exemplar system 102, according to an embodiment of the present disclosure. The system 102 includes a robot arm 104 that is executing an assembly operation in the system. The robot arm 104 that machines workpieces 106 by a first tool 108 and a second tool 110. The workpieces 106 are then lifted by the robot arm 104 to shape an item 112. The control inputs are given to actuators to control the robot arm 104, the first tool 108 and/or the second tool 110. The examples of the control inputs may be, but are not limited to, a voltage, a current, a pressure, and/or a force applied at one or more joints of the robot arm 104.

The system 102 executing the assembly operation comprises a sequence of control steps to output a final product. There might be chances of producing an inaccurate product due to improper sequence of operations in a manufacturing process performed by the system 102 or presence of internal or external disturbances. Therefore, the anomaly detection is needed to ensure the quality of the product produced by these manufacturing processes.

In general, the process of the anomaly detection is done based on the features extracted from the images of the manufacturing process. In such process, the physical interaction of the variables cannot be considered and hence may not produce effective result in those cases where missing a minute detail can lead to improperly manufactured products. Alternatively, the process of the anomaly detection is carried out by a neural network where data of a current operation of the system 102 may be reconstructed by the neural network and the anomaly in the manufacturing process may be detected based on the reconstructed data and the original data. For complex manufacturing processes that include thousands of state variables, the data reconstruction in this way can be inaccurate and might produce undesired result.

It is an object of some embodiments of the present disclosure to propose a device suitable for the anomaly detection in manufacturing process of the system 102. It is another object of some embodiments to propose a method suitable for the anomaly detection in manufacturing process of the system 102. The proposed device of the present disclosure may include an anomaly detector for the anomaly detection in manufacturing process of the system 102 with the help of an attention model. The proposed method of the present disclosure may include an anomaly detection method for the anomaly detection in the manufacturing process of the system 102 with the help of the attention model.

Generally, in the context of neural networks, "attention" was designed for transcribing speech. For example, in an attempt to transcribe the utterance "bank of a river," the notion of the river is important for interpreting the word "bank" to distinguish a riverbank from a financial organization. Hence, the attention mechanism has been designed to place different parts of an utterance in the context of each other in a manner implementable by neural networks. However, the present disclosure discloses the attention model that can be adapted for the anomaly detection in the manufacturing process of the system 102.

It may be understood, that in the present disclosure, a case of the assembly operation in the system 102 is considered for the anomaly detection. However, such anomaly detection may be equivalently used in any manufacturing process in the system 102. Examples of the manufacturing process are, but are not limited to, moving an object through a sequence of locations or machining a workpiece by different tools in a predetermined sequential or partially overlapping order. Further, the assembly operation may be an assembly operation performed by synchronized actions of different robotic manipulators.

Figure 2A:
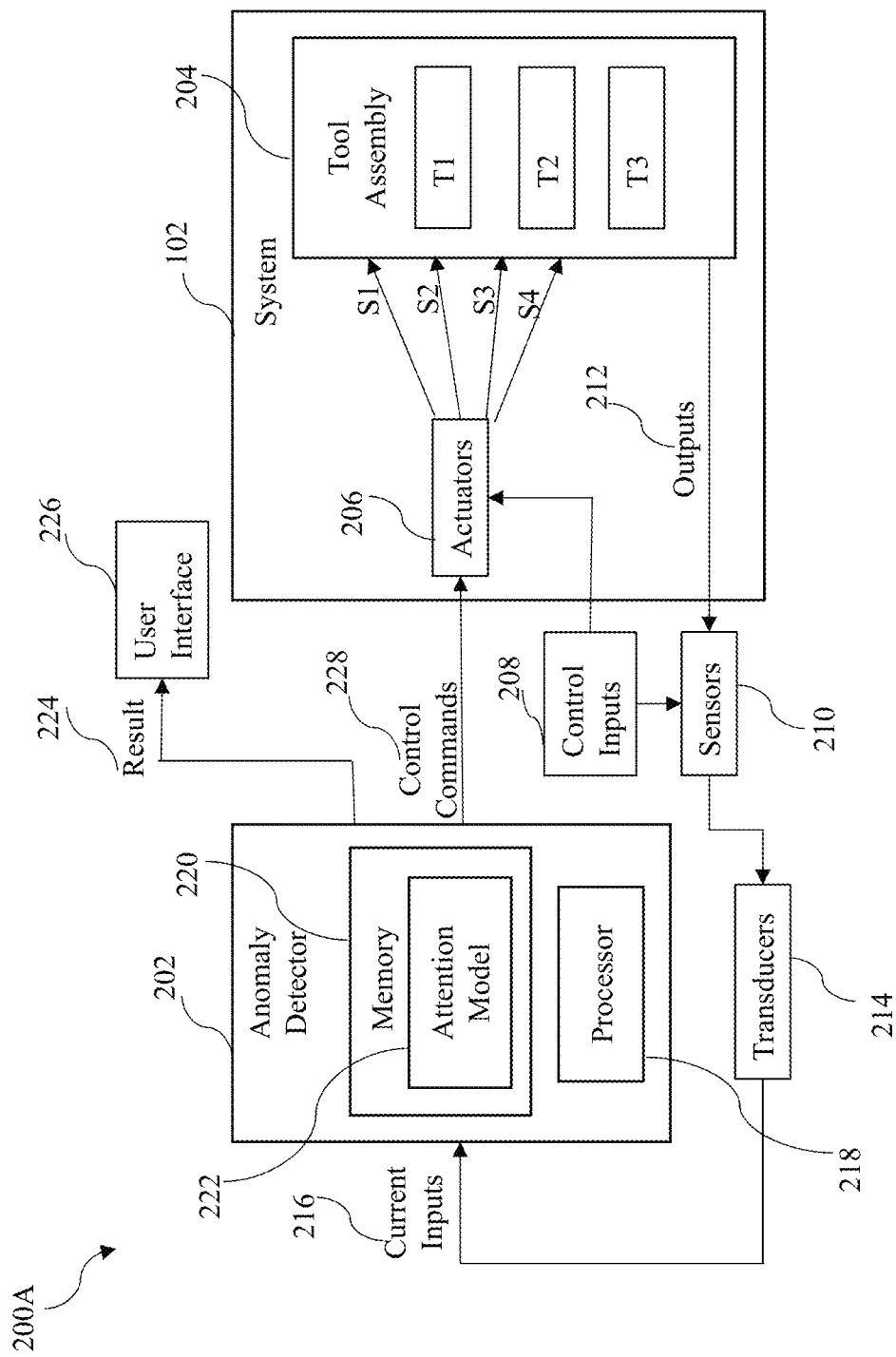
FIG. 2A illustrates an environment of an anomaly detector, according to some embodiments of the present disclosure.

FIG. 2A illustrates an environment 200A of the anomaly detector 202, according to an embodiment of the present disclosure. The environment 200A may further include the system 102 from which the anomaly detector 202 receives current inputs associated with a current operation of the system 102. The system 102 includes a tool assembly 204 to carry out manufacturing operations in the system 102. The system 102 may further include actuators 206 which transmits multiple signals like S1, S2, S3, and S4 to the tool assembly 204 comprising a plurality of tools like T1, T2, and T3. For example, in the system 102, the robot arm 104, the first tool 106, and the second tool 108 may be examples of the plurality of tools. The robot arm 104 may use other tools from the plurality of tools to shape and assemble the workpieces 106. The actuators 206 are fed with a sequence of control inputs 208 like voltage, current, force, viscosity, vibration, audio signal and the like to control the tool assembly. Further, the actuators 206 may be control devices like a motor, a generator, hydraulic devices, magnetic devices and the like. The plurality of tools of the tool assembly 204 may produce translational displacement, rotational displacement, vibration, friction, audio signal and the like in response to the signals provided by the actuators 206.

One or more sensors 210 read the sequence of control inputs 208 and a sequence of outputs 212 of the system produced by the sequence of control inputs 208. The sensors 210 may be employed in an electrical circuitry (not shown in FIG. 2A). The sensors 210 may be a group of sensors like position sensors, pressure sensors, temperature sensors, force sensors, and/or vibration sensors. The sensors 210 record all the signals received from the system 102 and transmit the sensor signals to transducers 214.

The transducers 214 are electronic devices that convert the sensor signals to electrical signals. These electrical signals are then provided to the anomaly detector 202 as current inputs 216. Hence, the current inputs 216 are combination of the sequence of control inputs 208 and the sequence of outputs 212 of the system 102 based on which the current operation of the manufacturing process in the system is carried out.

The anomaly detector 202 includes a processor 218 configured to control or execute functions of all the components of the anomaly detector 202. The processor 218 may be a single core processor like central processing unit (CPU), a multi-core processor, a computing cluster, or any number of other configurations. The anomaly detector 202 further includes a memory 220 in which an attention model 222 is stored. The memory 220 may include a non-transitory memory such as random access memory (RAM), read only memory (ROM), flash memory, or any other suitable memory systems. The anomaly detector 202 is configured to process the current inputs 216 to detect the anomaly in the manufacturing process of the system 102 with the help of an attention model 222. The attention model 222 may work on attention mechanism which is configured to encode the current inputs 216 into a latent space. Further, the anomaly detector 202 is configured to generate a result 224 of the anomaly detection and transmit the result 224 to display on a user interface 226.

The user interface 226 can be a display device like a monitor, a laptop, a projector, a mobile device and the like. The operator of the system may modify the actuator signals based on the displayed results 224. The anomaly detector 202 may generate control commands 228 based on the result 224 and may transmit control commands 228 to the actuators 206 to control the manufacturing process of the system 102. For example, the control commands 228 may be transmitted to an actuator of the actuators 206 to stop or pause an operation of a component of the system 102, in case the anomaly detector 202 detects an anomaly in the current inputs 216.

In an embodiment, the anomaly detector 202, the system 102, and the user interface 226 may communicate via a wired or wireless network (not shown in FIG. 2A). The network may include public networks such as an Internet, a telephone network, and a satellite communication network and/or a Local Area Network (LAN), a Wide Area Network (WAN) such as Ethernet (registered trademark). In addition, the examples of the network may include leased line networks such as Internet Protocol-Virtual Private Network (IP-VPN). In addition, the network may include wireless communication networks of Wi-Fi (registered trademark), Bluetooth (registered trademark), and the like.

Figure 2B:
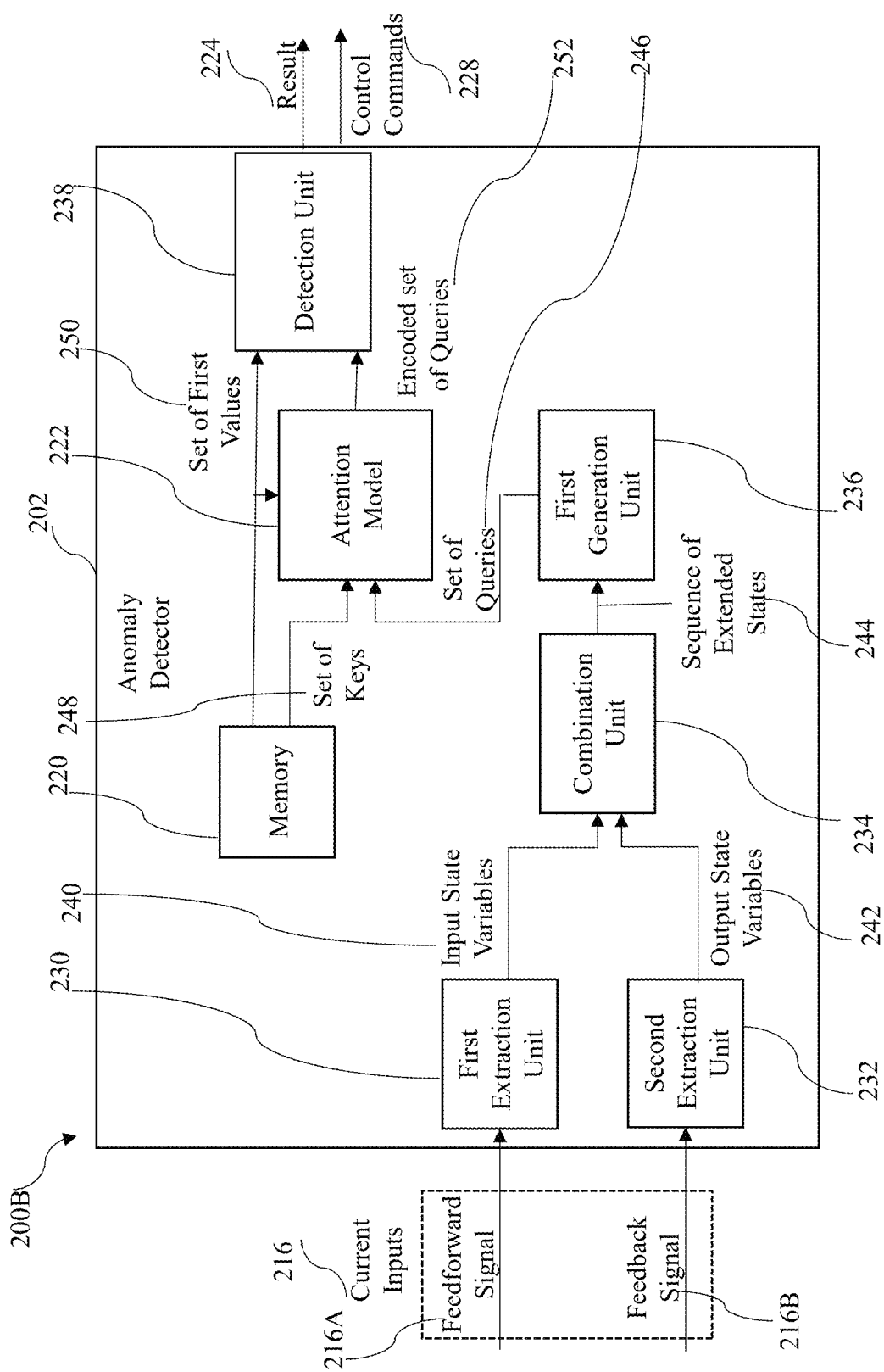
FIG. 2B illustrates a block diagram of the anomaly detector, according to some embodiments of the present disclosure.

FIG. 2B illustrates a block diagram 200B of the anomaly detector 202. The anomaly detector is fed with the current inputs 216 as explained with reference to the FIG. 2A. The current inputs 216 include a feedforward signal 216A and a feedback signal 216B recorded by the sensors 210. The feedforward signal 216A indicates the sequence of control inputs 208 provided to the actuators 206. The feedback signal 216B indicates the sequence of outputs of the system 212 caused by the plurality of actuators operated based on the sequence of control inputs 208.

The anomaly detector 202 further includes a first extraction unit 230, a second extraction unit 232, a combination unit 234, a first generation unit 236, and a detection unit 238. Further, the processor 218 may execute the function of the first extraction unit 230, the second extraction unit 232, the combination unit 234, the first generation unit 236, and the detection unit 238.

The first extraction unit 230 is configured to extract input state variables 240 from the feedforward signal 216A. The input state variables 240 indicates the sequence of control inputs 208 fed to the actuators 206. The input state variables 240 may be a plurality of first entities like values of physical entities such as voltages, current, tension, viscosity, resistance, valve openings and the like. Further, the input state variables 240 defines a state of the system 202.

The second extraction unit 232 is configured to extract output state variables 242 from the feedback signal 216B. The output state variables 242 indicates the sequence of outputs of the system 102 in response to the sequence of control inputs 208. The output state variables 242 may be values of position, orientation, sound, friction, vibration, pressure, and the like.

The combination unit 234 combines the extracted input state variables 240 and the output state variables 242 to produce a sequence of extended states 244 of the system 102.

In general, in a manufacturing process i.e., the assembly operation in FIG. 1, only the sequence of control inputs 208 are considered for a process of anomaly detection in the system. Such process of the anomaly detection may lead to inefficient data analysis at granular level which in turn may produce unreliable results. As the anomaly detector 202 of the present disclosure process the combination of the input state variables 240 and the output state variables 242, a large amount of data can be analyzed and thereby, the chances of error in the result of the manufacturing process of the system 102 decreases. In addition to that, the collection of large amount of data directly from the sensors 210 provides practical approach to the anomaly detection which leads to accurate and reliable result even at the granular level of the manufacturing process. Further, with this practical approach, the attention model 222 doesn't need to learn the dependency of one data into other, which further reduces a training time of the attention model and reduce the storage space in the memory 220.

The first generation unit 236 is configured to generate a set of queries 246 based on the sequence of extended states 244. Each query of the set of queries 246 is a vector, and each element of the vector is a value and/or another vector with values of the corresponding first entities. The first generation unit 236 may extract features of each entity of the plurality of first entities and generate a vector for each first entity of the plurality of first entities. For example, the first generation unit 236 may extract different values like a magnitude, a frequency, a phase and the like from each of the plurality of first entities like voltage, current, pressure, etc. The first generation unit 236 then generates a query of the set of queries 246 for each control step of the manufacturing process of the system 102 based on the extracted different values. The manufacturing process of the system 102 may be divided in a plurality of control steps. Each control step can be defined as a time step of the manufacturing process. For example, the first generation unit 236 may generate a query for each thirty or forty seconds of the manufacturing process. All the control steps of the manufacturing process may not be of equal time duration and may vary from each other. Further, the dimension of each first entity may vary from each other. Therefore, a dimension of elements of the query of the set of queries 246 may differ from each other. The generated set of queries 246 is transmitted to the attention model 222.

Conventional anomaly detection methods are generally based on the comparison of a state of the normal operation with a state of the current operation of the system 102. To that end, state variables of the normal state need to be compared with state variables of the current state. Hence, a problem arises in the comparison due to varying dimensions of the state variables. This multiple dimensionality problem can be addressed using the attention model 222. In general, attention models, or attention mechanisms, are input processing techniques for neural networks that allow the network to focus on specific aspects of a complex input, one at a time until the entire dataset is categorized. The goal of the attention mechanism is to break down complicated tasks into smaller areas of attention that are processed sequentially.

The attention model 222 may provide a low-dimensional representation of the sequence of extended states 244 of the manufacturing process of the system 102. This adaptation includes several steps performed online and/or offline, i.e., before the beginning of the anomaly detection process. The attention model 222 compares the set of queries 246 with a set of keys 248 to produce a plurality of attention weights. While the set of queries 246 indicates the sequence of extended states 244 of the current operation of the system 102, the set of keys 248 indicates a sequence of extended states of system 102 during a normal, non-anomalous operation. A set of exemplars of the normal operation is used as the set of keys 248 in the attention model. Each exemplar defines an extended state of a normal operation of the manufacturing process of the system 102. Each exemplar or key is a vector, and each element of the vector is a value and/or another vector with values of the corresponding second entity. In such a way, each element of the key represents a second entity of a plurality of second entities. The plurality of second entities may be a value of physical entities such as voltage, current, pressure, friction, viscosity and the like. The set of keys 248 is defined in advance to represent different distinctive examples of the extended state for the normal operation. The pair of the set of keys 248 and a set of first values 250 are stored in the memory 220 of the anomaly detector 202. Each key of the set of keys 248 is paired with a corresponding first value of the set of first values 250. The set of values 250 is designed for the corresponding set of keys 248 by embedding each key into a low-dimensional space. Hence, the first value is an embedding of a key with the dimension lower than the dimension of the extended state of the normal operation. Such an embedding can be done offline, for example, with the help of the encoding neural network. Further, the attention model 222 generates an encoded set of queries 252 based on the comparison of the set of queries 246 with the set of keys 248. The encoded set of queries 252 indicates the sequence of extended states 244 of the current operation with context of the sequence of extended states of the normal operation. The function of the attention model 222 will be described in detail with reference to FIG. 2C and FIG. 2D.

The detection unit 238 detects the anomaly in the manufacturing process of the system 102 based on the encoded set of queries 252 and the set of first values 250. The detection unit compares encoded set of queries 252 and the set of first values 250 using a predetermined convex subspace of the latent space. The details of the predetermined convex subspace will be described with reference to FIG. 4. Further, the detection unit 238 may generate the result 224 of the anomaly detection. In one embodiment, the detection unit 238 may output the result 224 on the user interface 226. In other embodiment, the detection unit 238 may output the control commands 230 to control the manufacturing process of the system 102 based on the anomaly detection.

Figure 2C:
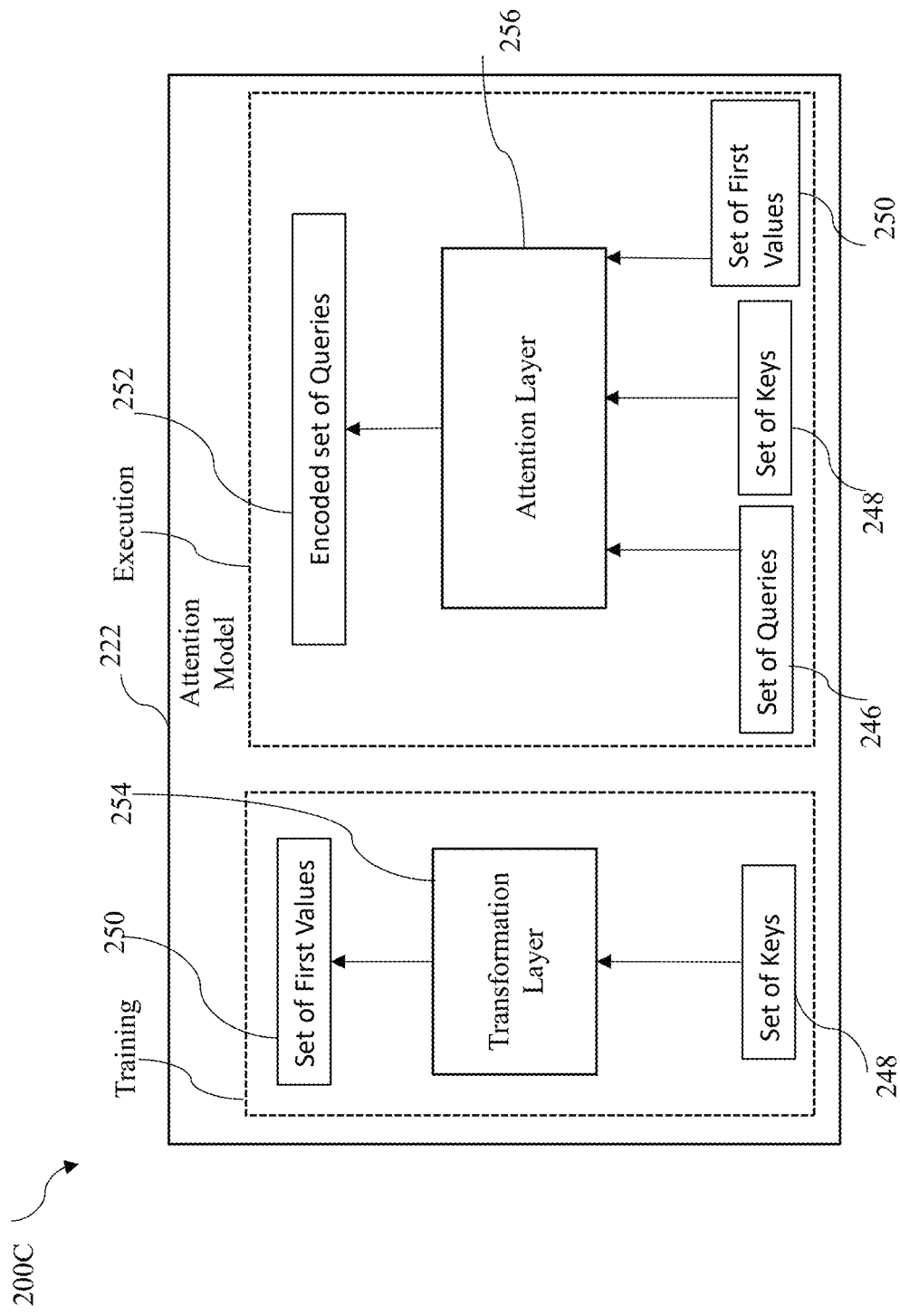
FIG. 2C illustrates a block diagram of an attention model, according to some embodiments of the present disclosure.

FIG. 2C illustrates a block diagram 200C of the attention model 222. The attention model 222 includes a transformation layer 254 and an attention layer 256.

The transformation layer 254 transforms the set of keys 248 which are multi-dimensional into lower dimensional set of first values 250. In other words, the set of keys 248 are encoded in the latent spaces as the set of first values 250 in the transformation layer 254. Since, the set of keys 248 is associated with the normal operation of the system 102, the encoding of the set of keys 248 into the set of first values 250 may be done during training of the attention model 222. In one embodiment, the encoding of the set of keys 248 into the set of first values 250 may be done by an autoencoder neural network. The autoencoder neural network may capture important elements of a key and encode the key into a first value based on the captured elements in an unsupervised manner. Further, the pair of the set of keys 248 and the set of first values 250 is stored in the memory 220.

While the set of keys 248 may be encoded into the set of first values 250 during a training period of the attention model 222, the set of queries 246 may be transformed into the encoded set of queries 252 during an execution period of the attention model 222. The execution period is defined as a period of execution of the current operation of the system 102. Further, each of the set of queries 246 is encoded as a weighted linear combination of the set of first values 250 weighted with a corresponding attention weight of a plurality of attention weights to produce an encoding of each extended state of the sequence of extended states 244 in the latent space. To that end, the attention layer 256 receives the set of keys 248 and the set of first values 250 from the memory 220. In addition to that, the attention layer 256 receives the set of queries 246 associated with the current operation of the system 102 based on the sequence of control inputs 208 and the sequence of outputs of the system 102 recorded by the sensors 210. The attention layer 256 is configured to process the set of queries 246, the set of keys 248, and the set of first values 250 to encode each query of the set of queries 246 to the latent space. This encoding reduces the dimension of the set of queries 246, for example, ten-dimensional query may be transformed into two-dimensional query in the embedded space or the latent space.

Figure 2D:
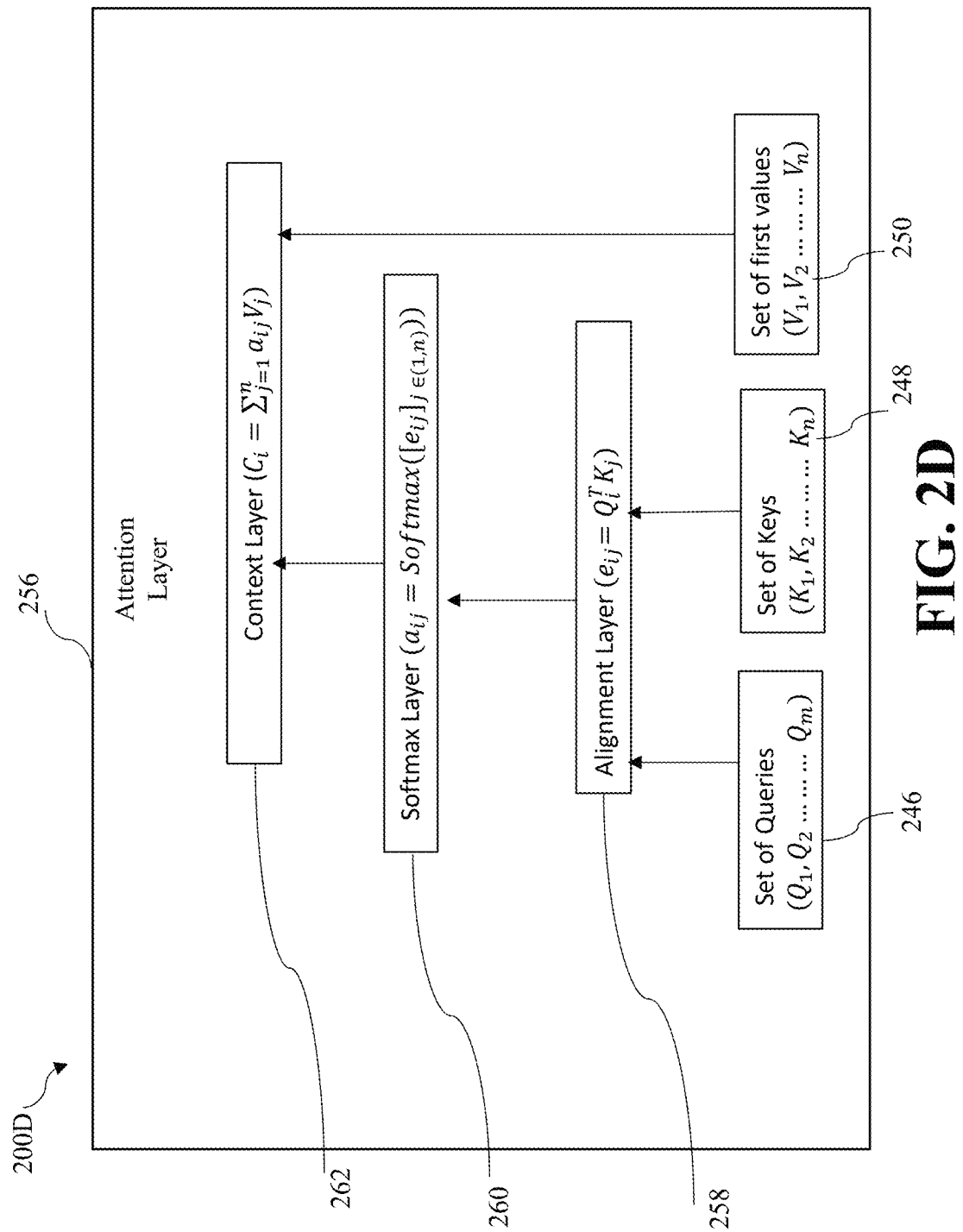
FIG. 2D illustrates a block diagram of an execution period of the attention model for the plurality of control steps of a manufacturing process of the system, according to some embodiments of the present disclosure.

FIG. 2D illustrates a block diagram 200D of the execution period of the attention model 220 for the plurality of control steps of the manufacturing process of the system 102, according to some embodiments of the present disclosure. The block diagram 200D includes an expansion of the attention layer 256 of the attention model 222. The attention layer 256 includes an alignment layer 258, a softmax layer 260, and a context layer 262.

In the alignment layer 258, the set of queries ($Q_1$, $Q_2 \ldots Q_m$) 246 and the set of keys ($K_1$, $K_2 \ldots K_n$) 248 are received. These queries and keys may represent a voltage signal, a pressure signal, a current signal, a vibration signal and the like. There may be hundreds of queries and keys. Further, each of the query of the set of queries 246 associated with the current operation of the system 102 is compared with the set of keys 248 associated with the normal operation of the system 102 in the alignment layer 258. To that end, each element of the query may be compared with a corresponding element of the key. For example, the first entity such as voltage of the query is compared with the second entity such as voltage of the key, pressure of the query is compared with pressure of the key, position of the query is compared with the position of the key and so on. The set of queries 246 and the set of keys 248 may be compared by combining a similarity distance between the first entity of the plurality of first entities and a corresponding second entity of the plurality of second entities. The similarity distance for comparing the corresponding first entity and the second entity may be obtained from a mathematical space that is used to describe the first entity and the second entity. The mathematical space is defined by the geometry of the space characterizing the first entity and the second entity. For example, if the first entity and the second entity capture the pose (rotation and translation) of a robotic arm, then the mathematical space for the first and second entity would be the space and distance like the non-linear Riemannian geodesic distance. In some cases, the distance is normalized to be within a range to match the range of other distances between other corresponding first and second entities in the pluralities of such entities and their respective distances. Further, to compare each query with the set of keys 248, a dot product of each element of the query of the set of queries 246 and the corresponding element of each of the set of keys 248 may be calculated. All the result of the dot product can be normalized to have a comparison value for each query of the set of queries 246. The comparison of the set of queries 246 and the set of keys 248 is expressed as ($e_{ij}=Q_i^T K_j$), where ($e_{ij}$) represents a comparison value of i-th query ($Q_i$) of the set of queries 246 and j-th key ($K_j$) of the set of keys 248. In one embodiment, the mathematical space may be an euclidean distance between two entities in an euclidean space. In other embodiment, the mathematical space may be a Riemannian geodesic distance between the two entities.

In the softmax layer 260, a softmax function is applied to the comparison values of the i-th query ($Q_i$) and the j-th key ($K_j$) to produce an attention weight $a_{ij}$ for the i-th query. The attention weight $a_{ij}$ can be expressed as: ($a_{ij}=$ Softmax($[e_{ij}]_{j\in(1,n)}$)). In this way, a plurality of attention weights can be generated, where an attention weight of the plurality of attention weights corresponds to a respective query of the set of queries 246. The plurality of attention weights is then transmitted to the context layer 262.

In the context layer 262, the encoded set of queries 252 calculated for the set of queries 246 based on the attention weight ($a_{ij}$) and the set of first values ($V_1, V_2 \ldots V_n$) 250. To that end, each query of the set of queries 246 is encoded as a weighted linear combination of the set of first values 250 weighted with a corresponding attention weight of the plurality of attention weights. The encoded i-th query may be expressed as ($C_i=\Sigma_{j=1}^{n} a_{ij} V_j$)

Figure 3:
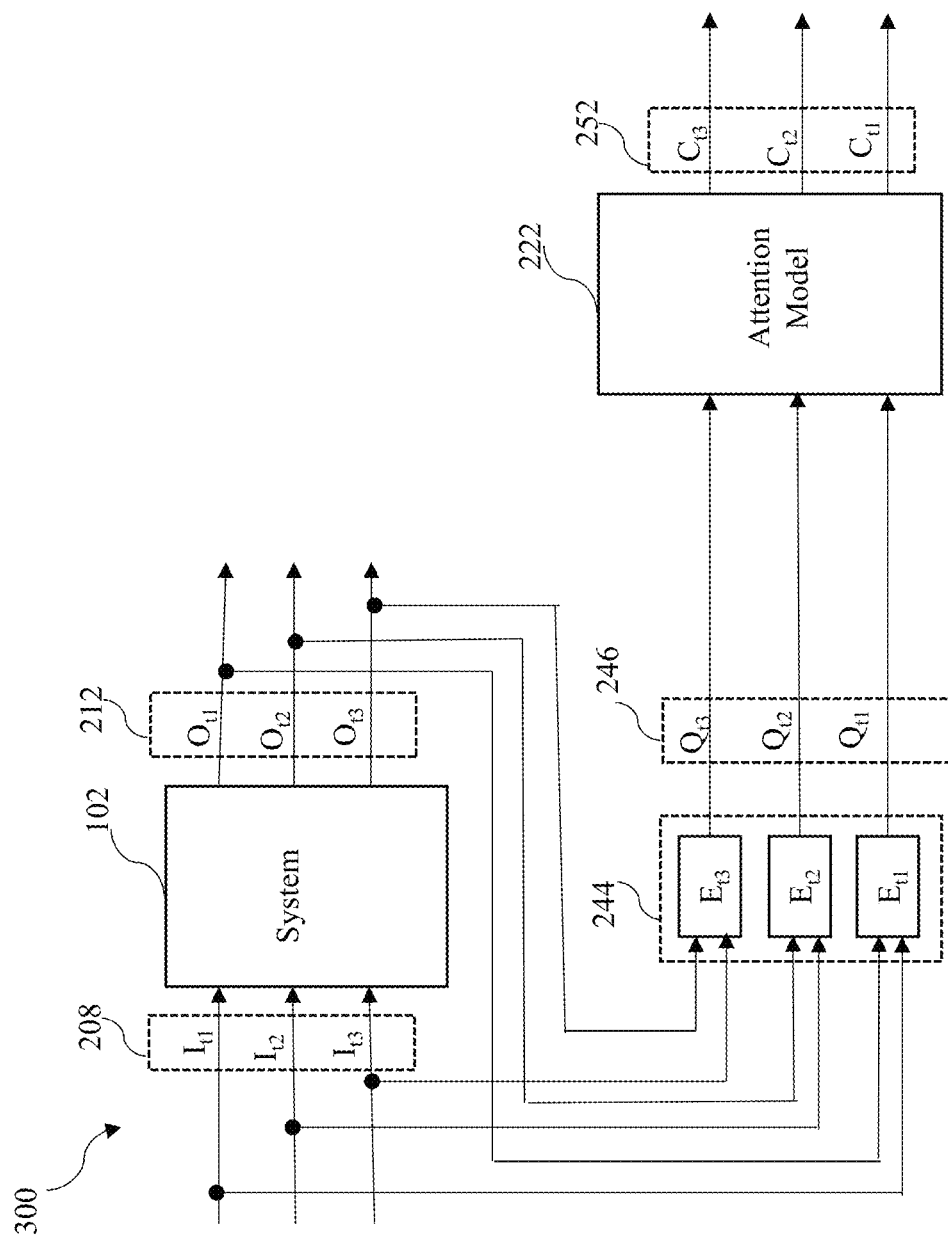
FIG. 3 illustrates a block diagram for encoding an extended state of the sequence of extended states in a latent space for each control step of a plurality of control steps of the manufacturing process of the system, according to some embodiments of the present disclosure.

FIG. 3 illustrates a block diagram 300 for encoding an extended state of the sequence of extended states 244 in the latent space for each control step of the plurality of control steps of the manufacturing process of the system 102, according to some embodiments of the present disclosure.

The system 102 includes the manufacturing process in which one manufacturing operation is carried out in one control step. The sequence of control inputs 208 is provided to the system 102 during the manufacturing process to obtain the plurality of sequences of outputs 212. For example, a first operation may be performed by the tool T1 shown in FIG. 2A in a first control step ($t_1$) of the plurality of steps, a second operation may be performed by the tools T2 and T3 shown in FIG. 2A in a second control step ($t_2$) of the plurality of steps, a third operation may be performed by the tools T1 and T3 in a third control step ($t_3$) of the plurality of steps. In the first operation, the tool T1 may require a first set of control inputs ($I_{t1}$) of the sequence of control inputs 208 to generate a first set of outputs ($O_{r1}$) of the sequence of outputs 212 at the first control step ($t_1$). The examples of the first set of control inputs ($I_{r1}$) may be, but not limited to, voltage, current, pressure, and the like and the examples of the first set of outputs ($O_{r1}$) may be, but not limited to, linear displacement, friction and the like. In the second operation, the tools T2 and T3 may require a second set of control inputs ($I_{r2}$) of the sequence of control inputs 208 to generate a second set of outputs ($O_{r2}$) of the sequence of outputs 212 at the second control step ($t_2$). The examples of the second set of control inputs ($I_{r1}$) may be, but not limited to, current, haptic input, audio input, and the like and the examples of the second set of outputs ($O_{r1}$) may be, but not limited to, rotational displacement, friction, audio output, and the like. Similarly, in the third operation, the tools T1 and T3 may require a third set of control inputs ($I_{r3}$) of the sequence of control inputs 208 to generate a second set of outputs ($O_{r3}$) of the sequence of outputs 212 at the third control step ($t_3$). The examples of the third set of control inputs ($I_{r1}$) may be, but not limited to, pressure, temperature, vibration, and the like and the examples of the third set of outputs ($O_{r1}$) may be, but not limited to, thermal displacement, friction, and the like.

The combination unit 234 shown in FIG. 2B may combine input state variables 240 representative of the first set of control inputs ($I_{r1}$) and output state variables 242 representative of the first set of outputs ($O_{r1}$) to form a first extended state ($E_{r1}$) of the sequence of extended states 244 corresponding to the first control step ($t_1$). Further, the combination unit 234 may combine input state variables 240 representative of the second set of control inputs ($I_{r2}$) and output state variables 242 representative of the second set of outputs ($O_{r2}$) to form a second extended state ($E_{r2}$) of the sequence of extended states 244 corresponding to the second control step ($t_2$). Similarly, the combination unit 234 may combine input state variables 240 representative of the third set of control inputs ($I_{r3}$) and output state variables 242 representative of the third set of outputs ($O_{r3}$) to form a third extended state ($E_{r3}$) of the sequence of extended states 244 corresponding to the third control step ($t_3$).

The first generation unit 236 shown in FIG. 2B may generate a first query ($Q_{r1}$) of the set of queries 246 based on the first extended state ($E_{r1}$) corresponding to the first control step ($t_1$). Further, the first generation unit 236 may generate a second query ($Q_{r2}$) of the set of queries 246 based on the second extended state ($E_{r2}$) corresponding to the second control step ($t_2$). Similarly, the first generation unit 236 may generate a third query ($Q_{r3}$) of the set of queries 246 based on the third extended state ($E_{r3}$) corresponding to the third control step ($t_3$).

The attention model 222 may encode the first query ($Q_{r1}$) corresponding to the first control step ($t_1$) to generate a first encoded query ($C_{r1}$) of the encoded set of queries 252. Further, the attention model 222 may encode the second query ($Q_{r2}$) corresponding to the second control step ($t_2$) to generate a second encoded query ($C_{r2}$) of the encoded set of queries 252. Similarly, the attention model 222 may encode the third query ($Q_{r3}$) corresponding to the third control step ($t_3$) to generate a third query ($C_{r3}$) of the encoded set of queries 252.

It may be understood that here the manufacturing process of three control steps is considered. However, the manufacturing process may take place in plurality of control steps.

Figure 4:
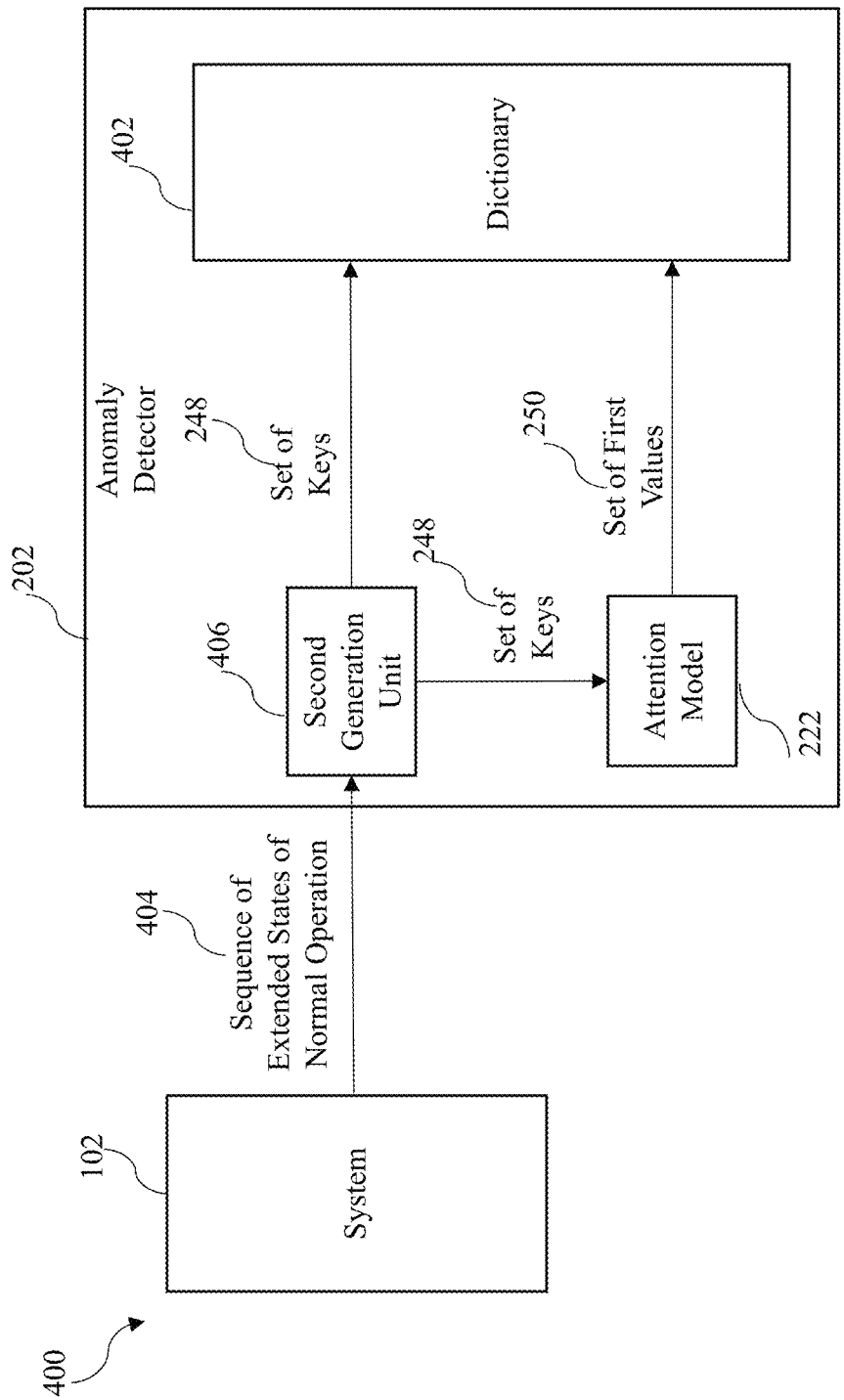
FIG. 4 illustrates a block diagram for learning a dictionary during the normal operation of the system, according to some embodiments of the present disclosure.

FIG. 4 illustrates a block diagram 400 for learning a dictionary 402 during the normal operation of the system 102, according to some embodiments of the present disclosure.

The processor 218 is configured to learn the dictionary 402 during the training of the attention model 222. The dictionary 402 may be in a form of a dictionary matrix having the pair of the set of keys 248 and the set of first values 250 stored during the normal operation. To that end, the anomaly detector 202 receives a sequence of extended states of normal operation 404 from the system 102. The anomaly detector 202 includes a second generation unit 406 configured to generate the set of keys 248 from the sequence of extended states of normal operation 404. The second generation unit 406 may extract features of the state variables of the sequence of extended states of normal operation 404 and convert it into vector forms as the set of keys 248. Each element of a key of the set of keys 248 defines a second entity of the normal operation. Further, each key of the set of keys 248 defines an extended state of the normal operation. Each key is a vector, and each element of the vector is a value and/or another vector with values of the corresponding state variables. It may be understood that the processor 218 executes the function of the second generation unit 406. Further, the second generation unit 406 transmits the set of keys 248 to the attention model 222 and the dictionary 402. The attention model 222 transforms the set of keys 248 into the set of first values 250 as described above with reference to FIG. 2C. The set of first values 250 is then transmitted to the dictionary 402. Further, the dictionary 402 may be stored in the memory 220 of the anomaly detector 202. One or more columns of the dictionary 402 may comprise extremum values of the set of first values 250 which are in the latent space. The dictionary 402 may be learned in an end-to-end manner, such that all normal samples of the normal operation are learned to be within a predetermined convex subspace. Further, the columns of the dictionary may be learned using neural network that takes as input the weighted linear combination of the first values and reconstructs them as convex combinations of the dictionary columns, a neural variant of the classical dictionary learning and sparse coding formulation or the classical archetypal analysis formulation. The normal samples represents samples of the set of first values 250 which in turn represents the embeddings of the sequence of extended states of normal operation 404 in the latent space.

Figure 5:
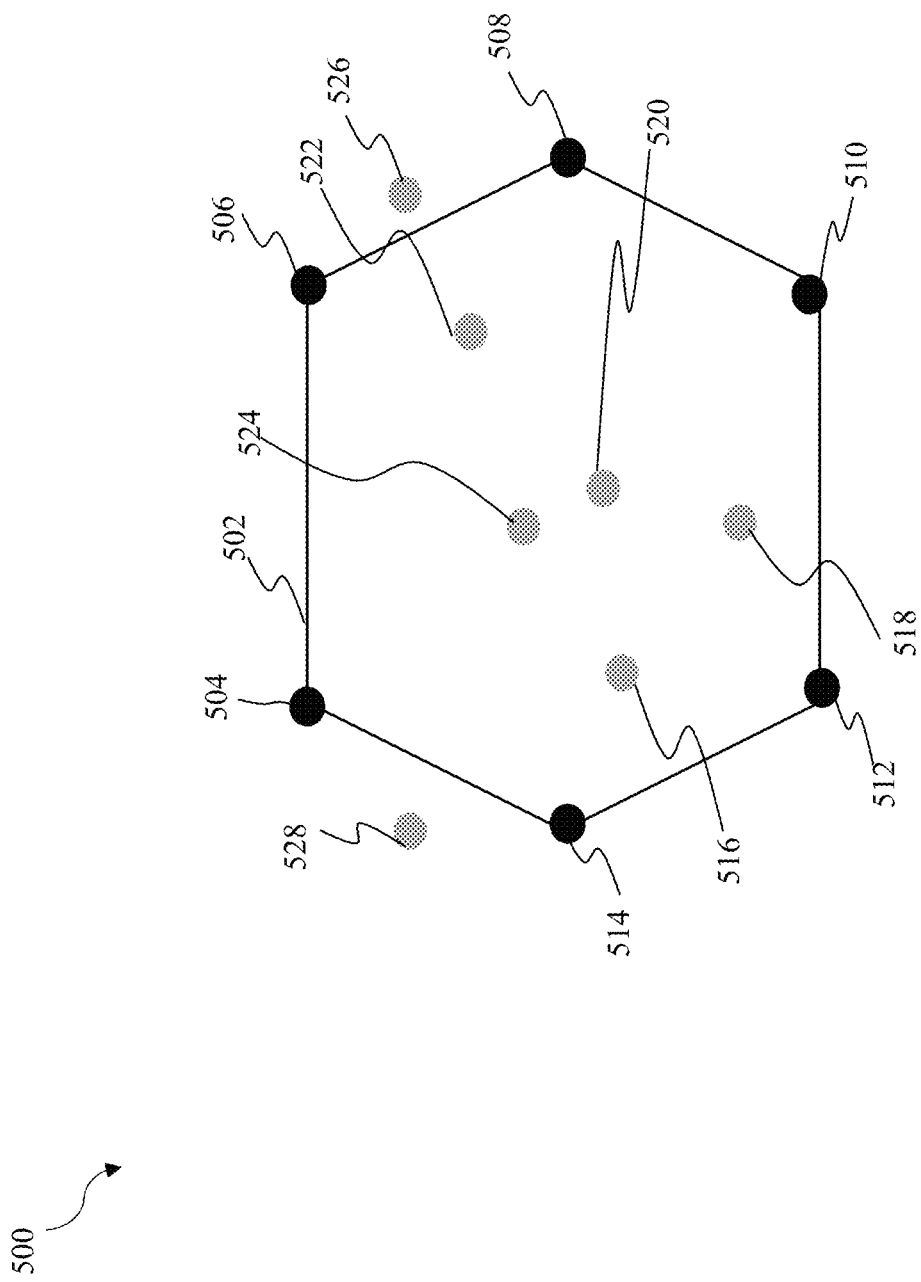
FIG. 5 illustrates a schematic diagram of a predetermined convex subspace, according to some embodiments of the present disclosure.

FIG. 5 illustrates a schematic diagram 500 of the predetermined convex subspace 502, according to some embodiments of the present disclosure.

The processor 218 is configured to generate the predetermined convex subspace 502 in the latent space based on the set of first values 250 and the dictionary 402. To that end, the processor 218 uses the dictionary 402 to determine all the normal samples and the extremum values of the normal samples of the normal operation. The processor 218 is further configured to generate the predetermined convex subspace 502 where a boundary of the predetermined convex subspace 502 is determined by the extremum values of the normal samples of the normal operation. In other words, the extremum values of the set of first values 250 are a normal sample 504, a normal sample 506, a normal sample 508, a normal sample 510, a normal sample 512, and a normal sample 514. These normal samples are on the boundary of the predetermined convex subspace 502. Since, the set of first values 250 are embeddings of the sequence of extended states of normal operation 404 in the latent space, the predetermined convex subspace 502 is generated in the latent space. The predetermined convex subspace may be a convex hull in which convexity of the convex hull that contains all the normal samples of the normal operation.

The processor 218 is further configured to detect the anomaly in the current operation of the system 102 when at least one encoded query of the encoded set of queries 252 is outside the predetermined convex subspace 502 in the latent space. To that end, the processor 218 is configured to determine a position of current samples of the current operation with respect to the predetermined convex subspace 502. The current samples represent samples of the encoded set of queries 252 that in turn represents embedding of the sequence of extended states 244 in the latent space. The samples of the encoded set of queries 252 as shown in FIG. 5 are a current sample 516, a current sample 518, a current sample 520, a current sample 522 a current sample 524, a current sample 526, and a current sample 528. The positions of all the current samples are determined with respect to the predetermined convex subspace 502 to determine whether all the current samples lie within the predetermined convex subspace 502. As it can be seen in FIG. 5 that the current sample 526 and the current sample 528 lies outside the predetermined convex subspace 502, the processor 218 detects the anomaly in the current operation. The determination process for all the current samples may be performed for each control step of the manufacturing process and the processor 218 determines in which control step the anomaly is detected. Therefore, learning dictionary 402 based on the normal samples and locating the current samples in the predetermined convex subspace 502 where the convexity allows bounding the distribution of normal samples in the convex hull of the dictionary elements, allowing to characterize the out-of-distribution samples easily.

It may be understood that a shape of the predetermined convex subspace 502 is considered here as a hexagon, however, the predetermined convex subspace 502 may have any polygon shape depending on the nature of extremum values of the set of first values 250 defined in the dictionary 402.

Figure 6:
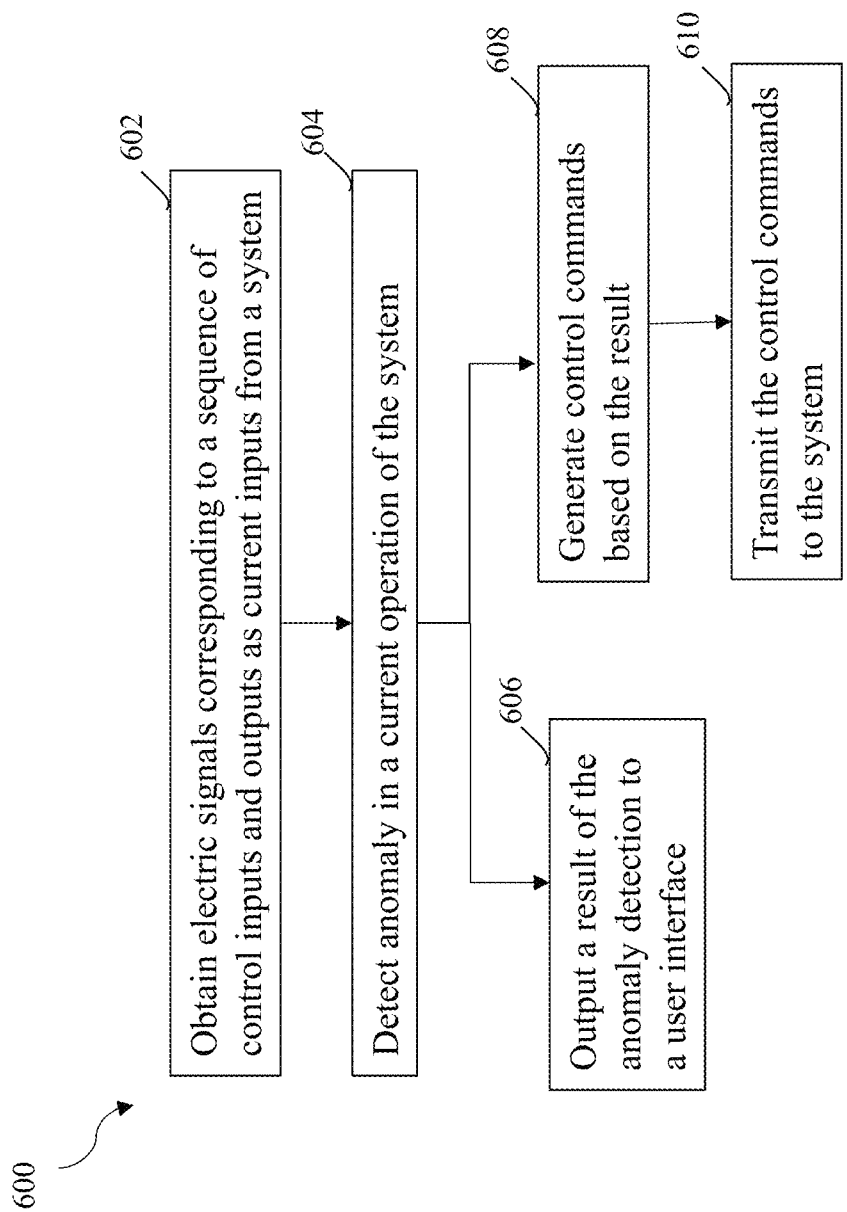
FIG. 6 illustrates a flowchart illustrating an interaction between the system and the anomaly detector to detect the anomaly in the current operation, according to some embodiments of the present disclosure.

FIG. 6 illustrates a flowchart 600 illustrating an interaction between the system 102 and the anomaly detector 202 to detect the anomaly in the current operation, according to an embodiment of the present disclosure.

At block 602, the anomaly detector 202 is configured to obtain electric signals corresponding to the sequence of control inputs 208 and the sequence of outputs 212 from the system 102 via the network. To that end, the sensors 208 records signals of the sequence of control inputs 208 like voltage, current, pressure, force and the like applied to actuators 206 of the system 102. In addition to that, the sensors 208 records signals of the sequence of outputs 212 caused by the actuators 206 of the system 102 in response to the sequence of control inputs 208. The sensors 210 transmits the recorded signals to the transducers 214 which converts the sensor signals to corresponding electrical signals and transmits to the anomaly detector 202. The sequence of control inputs 208 and the sequence of outputs 212 of the system 102 defines the sequence of extended states 244 of the system 102 during the current operation.

At block 604, the processor 218 configured to detect the anomaly in the current operation of the system based on the sequence of extended states 244 of the system 102. To that end, the processor 218 controls the attention model 222 which is stored in the memory 220 of the anomaly detector to encode the sequence of extended states 244 in the latent space. The processor 218 further detects the anomaly based on the encoded sequence of extended states 244 and the embedded sequence of extended states of the normal operation in the latent space. The details of the detection of the anomaly by the anomaly detector will be described in a flowchart shown in FIG. 7.

At block 606, the result 224 of the anomaly detection 202 is output by the anomaly detector 202 to display on the user interface 226. The result 224 may be transmitted to the user interface 226 via the wired or wireless network. Further, the operator of the system 102 may modify one or more parameters of the actuators 206 based on the displayed results 224 to avoid the anomaly.

At block 608, the anomaly detector 202 is configured to generate the control commands 228 for the actuators 206 based on the detection of the anomaly in the current operation. The control commands 228 may be generated to control one or more devices of the actuators 206 to avoid damage to the system 102.

At block 610, the anomaly detector 202 is configured to transmit the generated control commands 228 to the system 102. In one embodiment, the control commands 228 may be transmitted to a motor of the actuators 206 to change a speed of a tool of the system 102. In other embodiment, the control commands 228 may be transmitted to a rheostat to change a resistance of a tool of the system 102. In other embodiment, the control commands 228 may be transmitted to a temperature controller device to change a temperature of a tool of the system 102. In other embodiment, the control commands 228 may be transmitted to a power device to stop or pause the operation of a tool of the system 102. For example, in case of detection of a fault in a transmission line or failure in a circuit breaker of the transmission line, the control commands 228 may be immediately transmitted to the power device to stop or pause the operation of one or more tools which are coupled with the transmission line.

Figure 7:
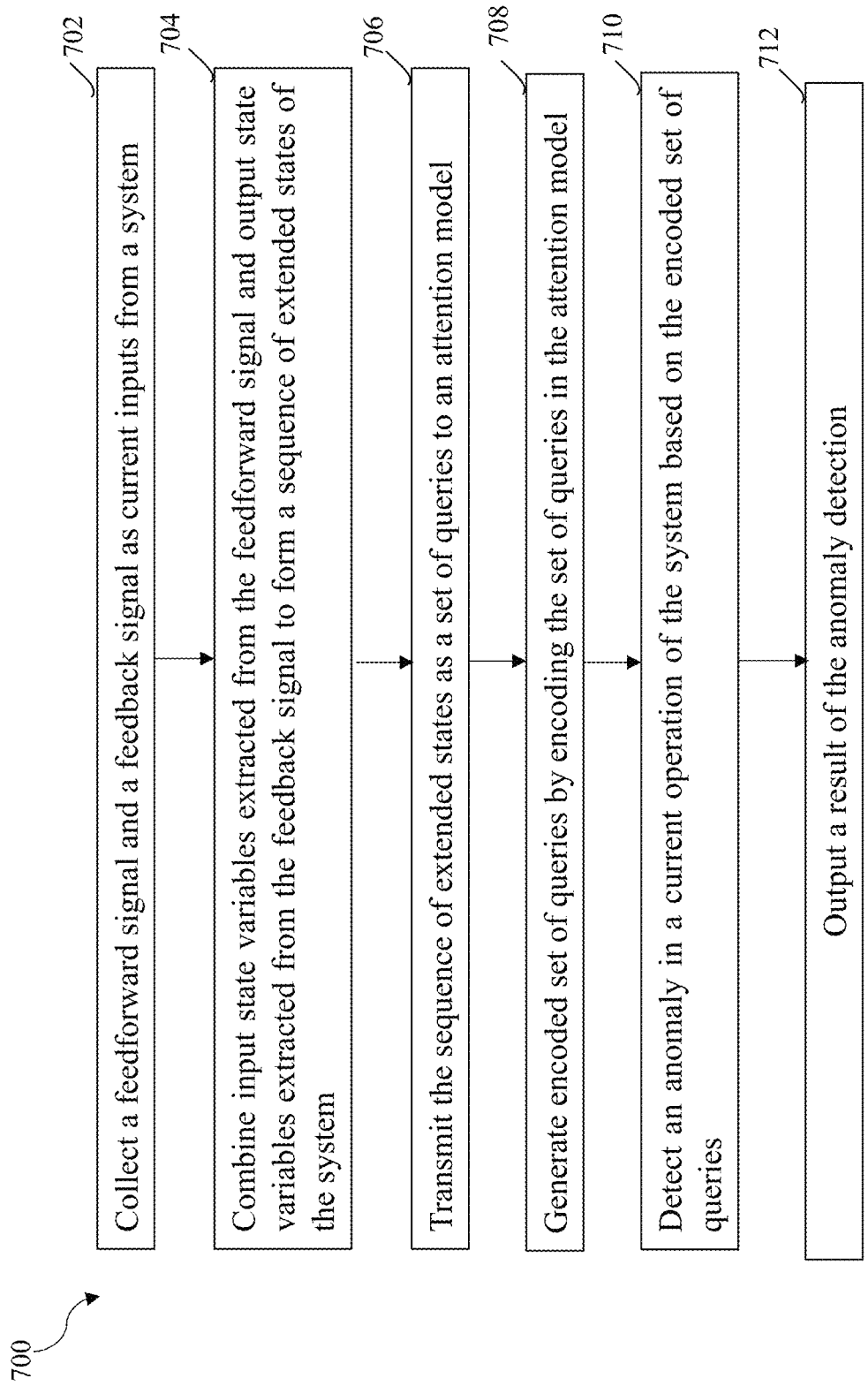
FIG. 7 illustrates a flowchart of an exemplary method for the anomaly detection in the current operation of the system.

FIG. 7 illustrates a flowchart 700 of an exemplary method for the anomaly detection in the current operation of the system 102.

At block 702, the anomaly detector 202 is configured to collect the feedforward signal 216A and the feedback signal 216B as the current inputs 216 from the system 102. The feedforward signal 216A indicates the sequence of control inputs 208 provided to the actuators 206. The feedback signal 216B indicates the sequence of outputs 212 of the system 102 caused by the plurality of actuators operated based on the sequence of control inputs 208.

At block 704, the processor 218 of the anomaly detector 202 is configured to combine the input state variables 240 extracted from the feedforward signal 216A and the output state variables 242 extracted from the feedback signal 216B to form the sequence of extended states 244 of the system 102. To that end, the processor 218 extracts the input state variables 240 from the feedforward signal 216A and output state variables 242 from the feedback signal 216B. The input state variables 240 indicates the sequence of control inputs 208 fed to the actuators 206. The output state variables 242 indicates the sequence of outputs 212 of the system 102 in response to the sequence of control inputs 208. The processor 218 further combines the input state variables 240 and the output state variables 242 to form the sequence of extended states 244 of the system 102.

At block 706, the processor 218 is configured to transmit the sequence of extended states 244 as the set of queries 246 to the attention model 222. To that end, the processor 218 extracts a magnitude, a frequency, a phase, and the like from each extended state of the sequence of extended states 244 to generate the set of queries 246.

At block 708, the processor 218 is configured to generate the encoded set of queries 252 from the set of queries 246 by the attention model 222. To that end, the attention model 222 compares each of the set of queries 246 with the set of keys 248 to produce the plurality of attention weights. The attention model 222 further encodes each of the set of queries 246 as a weighted linear combination of the set of first values 250 weighted with a corresponding attention weight of the plurality of attention weights. Each of the set of queries 246 is encoded to produce an encoding of a respective extended state of the sequence of extended states 244 in the latent space.

At block 710, the processor 218 is configured to detect the anomaly in the current operation of the system 102 based on the encoded set of queries 252. To that end, the processor 218 compares the encoded set of queries 252 and the set of first values 250 using the predetermined convex subspace 502 in the latent space. Both the encoded set of queries 252 and the set of first values 250 are embedded samples in the latent space. Hence, the predetermined convex subspace 502 is generated from the set of first values 250 and the samples of the encoded set of queries 252 is located with respect to the predetermined convex subspace 502 to determine whether the samples of the encoded set of queries 252 lies within the predetermined convex subspace 502. If any of the sample lies outside the predetermined convex subspace 502, the anomaly corresponding to that sample is flagged.

At block 712, the anomaly detector 202 is configured to generate the result 224 of the anomaly detection. In one embodiment, the generated result 224 may be output to the user interface 226. Additionally or alternatively, the processor 218 may generate control commands 228 based on the result 224 of the anomaly detection and transmit the generated result 224 to the system 102.

Figure 8:
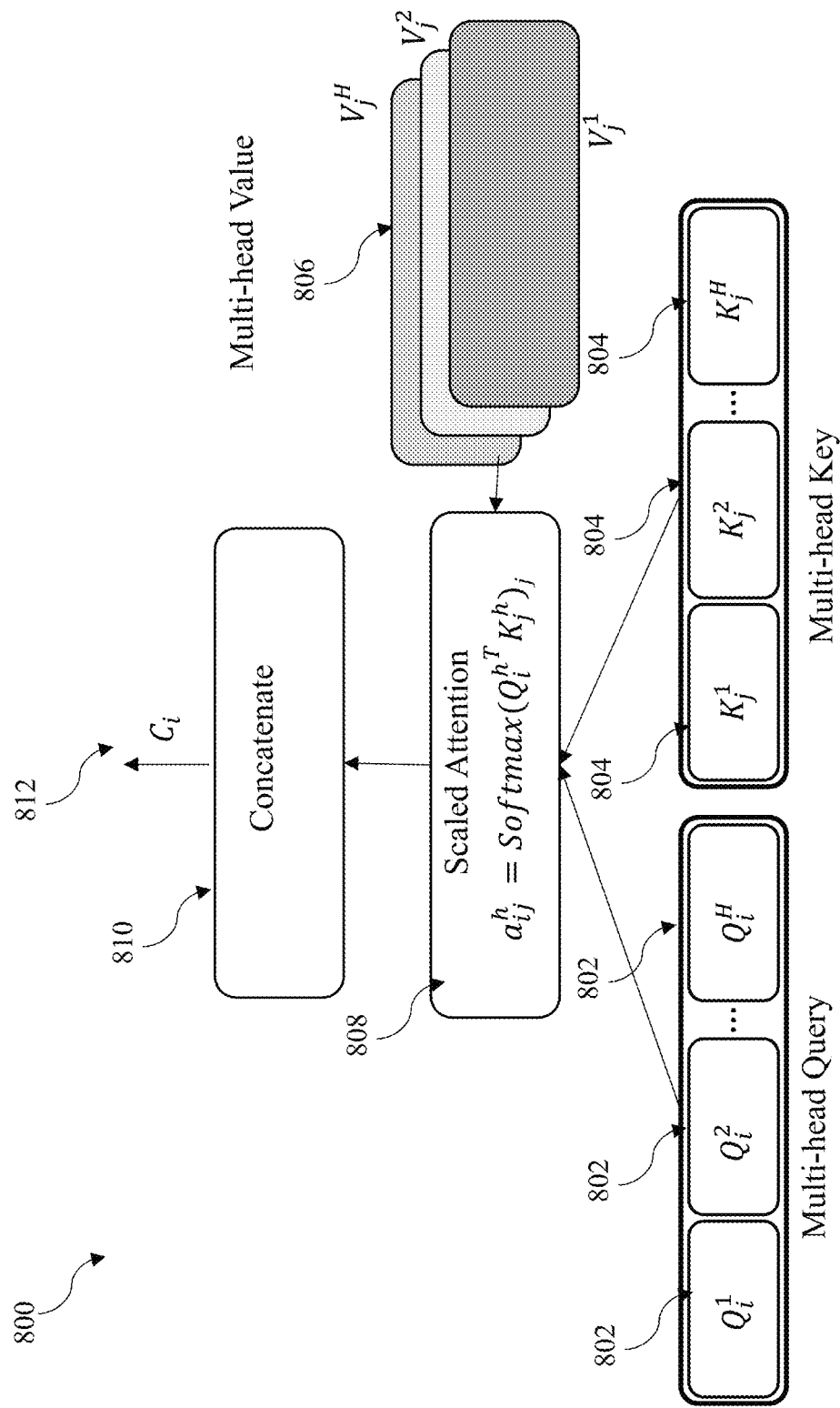
FIG. 8 illustrates a block diagram of the attention model based on a multi-headed attention mechanism, according to some embodiments of the present disclosure.

FIG. 8 illustrates a block diagram 800 of the attention model 222 based on a multi-headed attention mechanism, according to an embodiment of the present disclosure.

In the system 102 where multiple manufacturing processes are carrying out simultaneously, the multi-headed attention mechanism can be executed for joint anomaly detection. Each manufacturing process of the multiple manufacturing processes may produce different products in the system 102. In the multi-headed attention mechanism, several independent attention mechanisms can run in parallel for each manufacturing process and outputs of the several independent attention mechanisms are concatenated and transformed in the latent space. Specifically, the multi-head attention mechanism in FIG. 8 illustrated splitting of the dimensions of a query vector $Q_i$ 246 into heads $Q_i^h$, h=1, 2, ... H corresponding to sub-dimensions 802 and the key vector $K_j$ 248 into heads $K_j^h$, h=1, 2, ... H corresponding to sub-dimensions 804, respectively. The multi-head values $V_j^h$ 806 is produced via the low-dimensional embedding of the first values in the corresponding sub-dimensions of the key $K_j^h$ 804 using the transformation layer 254 of the autoencoder neural network, in which each head of the set of multi-heads in the key $K_j^h$ 804 is encoded using a different transformation layer 254 to produce the corresponding multi-head value $V_j^h$ of the set of multi-head values in 806. Additionally a layer for scaled attention 808 is the multi-head alignment layer 258 that compares each head $Q_i^h$ in the multi-head query $Q_i$ against the corresponding head $K_j^h$ in the multi-head key $K_j$ using a similarity distance based on the mathematical space of the corresponding heads of the multi-head query and the multi-head key. The attention weights produced by attention mechanism are scaled using the softmax operation over the corresponding heads across the set of keys 248 for j=1, 2, ..., n to produce the scaled attention weight vector 808 with the h-th attention weight vector value $a_{ij}^h$. Each such scaled attention value $a_{ij}^h$ is used to weigh the corresponding head of the multi-head value $V_j^h$. The weighted values are then linearly combined $C_j^h = \Sigma_j a_{ij}^h V_j^h$ and concatenated 810 to form a multi-head output $C_i$ 812 which is then used in the place of the encoded set of queries 252.

Figure 9:
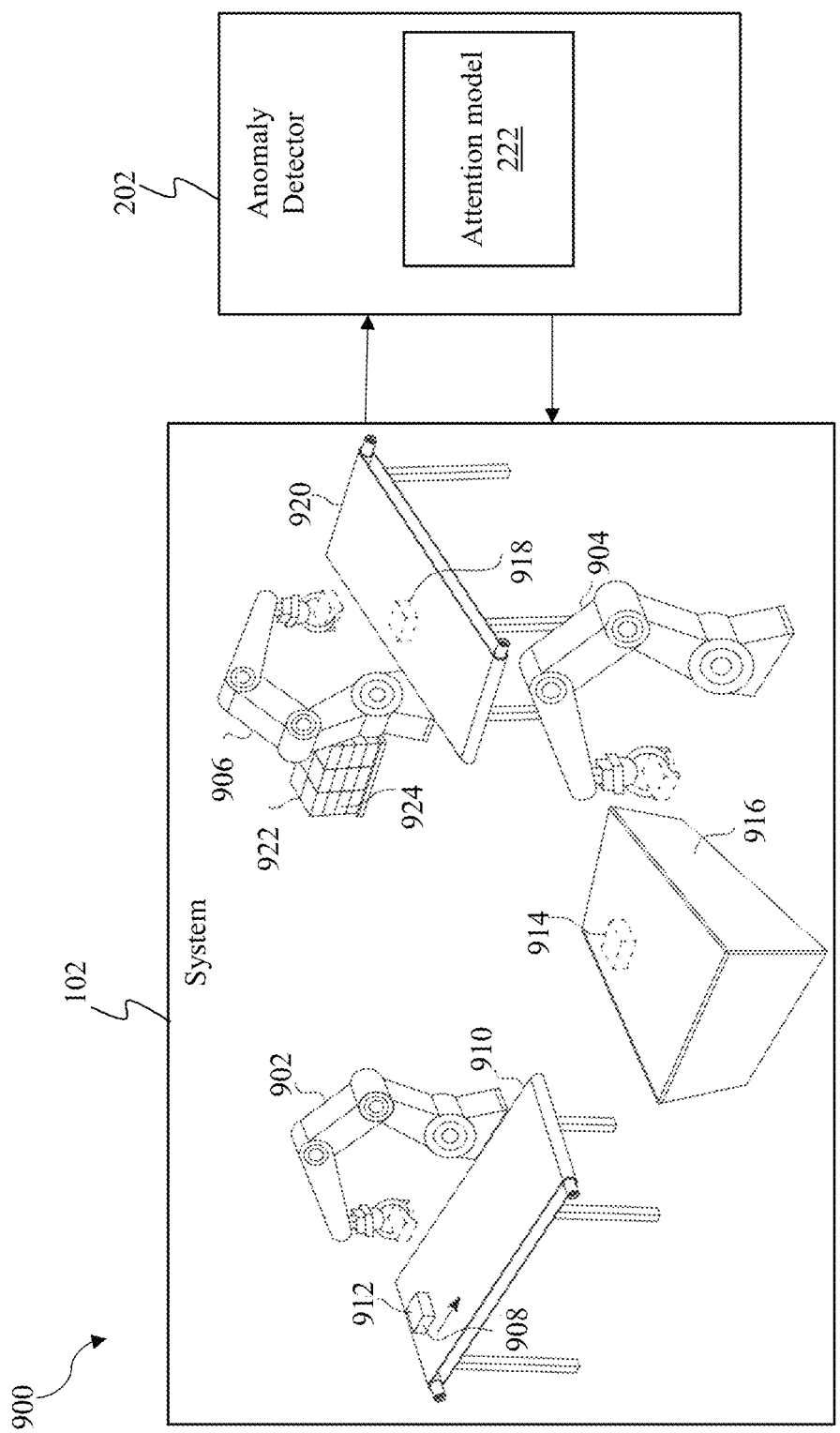
FIG. 9 illustrates a block diagram of a use case for controlling the system using the anomaly detector, according to some embodiments of the present disclosure.

FIG. 9 illustrates a block diagram 900 of a use case for controlling the system 102 using the anomaly detector 202, according to an embodiment of the present disclosure.

The system 102 indicates a factory automation scene where multiple robots 902, 904, and 906 manipulate an object 908 moving on a first conveyer belt 910. For example, the robot 902 moves the object 908 from a position 912 on the first conveyer belt 910 to a position 914 on a structure 916. Further, the robot 904 moves the object 908 from the position 914 to a position 918 on a second conveyer belt 920. Further, the robot 906 moves the object 908 from the position 914 to a position 922 to stack the object 908 on other objects 924.

The anomaly detector 202 receives current inputs corresponding to the current operation of the system. The current inputs define the sequence of extended states 244 of the current operation. The attention model 222 in the anomaly detector execute the attention mechanism to encode the sequence of extended states 244 into the latent space. The anomaly detector 202 detects anomaly in the current operation based the encoded set of queries 252. The anomaly detector 202 further generates control commands 228 based on the detection of the anomaly and transmit the control commands 228 to the system 102. In this way, the system 102 is controlled to avoid the anomalies in the current operation by the anomaly detector 202.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Individual embodiments above are described as a process which is depicted as a flowchart, a flow diagram, a data flow diagram, a structure diagram, or a block diagram. Although a flowchart shows the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Many modifications and other embodiments of the disclosure set forth herein will come to mind to one skilled in the art to which these disclosure pertain having the benefit of the teachings presented in the foregoing descriptions and the associated drawings. It is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

I claim:

1. An anomaly detector for controlling a system including a plurality of actuators assisting one or multiple tools to perform one or multiple tasks, comprising:
   at least one processor; and
   a memory having instructions stored thereon that, when executed by at least one processor, cause the anomaly detector to:
      collect a feedforward signal indicative of a sequence of control inputs to the plurality of actuators at a plurality of control steps;
      collect a feedback signal sensed by at least one sensor and indicative of a sequence of outputs of the system caused by the plurality of actuators operated based on the sequence of control inputs at corresponding control steps of the plurality of control steps;
      combine input state variables extracted from the feedforward signal and output state variables extracted from the feedback signal to form a sequence of extended states of the system;
      transmit the sequence of extended states as a set of queries to an attention model,
         wherein each extended state of the sequence of extended states corresponds to a respective query of the set of queries to the attention model, and
         wherein the attention model is configured to:
            compare each of the transmitted set of queries with a set of keys to produce a plurality of attention weights; and
            encode each of the set of queries as a weighted linear combination of a set of first values weighted with a corresponding attention weight of the plurality of attention weights to produce an encoding of each extended state of the sequence of extended states in a latent space,
            wherein each key of the set of keys is associated with a normal extended state of a normal operation of the system,
            wherein each first value of the set of first values is an encoding of a corresponding key of the set of keys into the latent space,
            wherein each attention weight of the plurality of attention weights is produced by comparing a plurality of first entities of a query of the set of queries with a plurality of second entities of a key of the set of keys in their respective states by combining the similarity distances between a first entity of the plurality of first entities and a corresponding second entity of the plurality of second entities, and
            wherein the similarity distance for comparing the first entity and the second entity is obtained from a mathematical space used to describe the first entity and the second entity;
      detect an anomaly in a current operation of the system based on the encoded set of queries;
      generate a result of the anomaly detection; and
   generate control commands based on the result of the anomaly detection and transmit the control commands to the system.

2. The anomaly detector of claim 1, wherein, during training of the anomaly detector, the at least one processor is further configured to learn a dictionary comprising extremum values of the set of first values.

3. The anomaly detector of claim 2, wherein the at least one processor is further configured to:
  generate a predetermined convex subspace in the latent space based on the set of first values and the dictionary, wherein a boundary of the predetermined convex subspace is determined based on the extremum values of the set of first values; and
  detect the anomaly in the current operation of the system when at least one encoded query of the encoded set of queries is outside the predetermined convex subspace of the latent space.

4. The anomaly detector of claim 1, wherein the at least one processor is further configured to:
  encode each key of the set of keys into a respective first value of the set of first values into the latent space during training of the anomaly detector; and
  store the set of keys and the set of first values into the memory.

5. The anomaly detector of claim 1, wherein the state variables extracted from the feedforward signal corresponds to at least one physical entity of the system.

6. The control system of claim 1, wherein each of the normal operation and current operation of the system includes at least one of an assembly operation performed by synchronized actions of different robotic manipulators, moving an object through a sequence of locations, or machining a workpiece by different tools in a predetermined sequential or partially overlapping order.

7. The anomaly detector of claim 1, wherein the at least one processor is further configured to transmit a first extended state of the sequence of extended states for a first control step of the plurality of control steps of the current operation of the system as a first query of the set of queries to the attention model.

8. The anomaly detector of claim 7,
  wherein the at least one processor is further configured to compare the first query with a first key of the set of keys for the first control step,
  wherein the first key is associated with the normal operation of the system for the first control step.

9. The anomaly detector of claim 1, wherein the attention model is based on a multi-headed attention mechanism, and wherein the at least one processor is further configured to encode the set of queries into the latent space based on the multi-headed attention mechanism.

10. The anomaly detector of claim 1, wherein the at least one processor is further configured to output the result of anomaly detection to a user-interface.

11. An anomaly detection method, comprising:
  collecting a feedforward signal indicative of a sequence of control inputs to a plurality of actuators at a plurality of control steps;
  collecting a feedback signal sensed by at least one sensor and indicative of a sequence of outputs of a system caused by the plurality of actuators operated based on the sequence of control inputs at corresponding control steps of the plurality of control steps;
  combining input state variables extracted from the feedforward signal and output state variables extracted from the feedback signal to form a sequence of extended states of the system;
  transmitting the sequence of extended states as a set of queries to an attention model,
    wherein each extended state of the sequence of extended states corresponds to a respective query of the set of queries to the attention model, and
  wherein the attention model is configured to:
    compare each of the transmitted set of queries with a set of keys to produce a plurality of attention weights; and
    encode each of the set of queries as a weighted linear combination of a set of first values weighted with a corresponding attention weight of the plurality of attention weights to produce an encoding of each extended state of the sequence of extended states in a latent space,
      wherein each key of the set of keys is associated with a normal extended state of a normal operation of the system,
      wherein each first value of the set of first values is an encoding of a corresponding key of the set of keys into the latent space,
      wherein each attention weight of the plurality of attention weights is produced by comparing a plurality of first entities of a query of the set of queries with a plurality of second entities of a key of the set of keys in their respective states by combining the similarity distances between a first entity of the plurality of first entities and a corresponding second entity of the plurality of second entities, and
      wherein the similarity distance for comparing the first entity and the second entity is obtained from a mathematical space used to describe the first entity and the second entity;
  detecting an anomaly in a current operation of the system based on the encoded set of queries;
  generating a result of the anomaly detection; and
  generating control commands based on the result of the anomaly detection and transmitting the control commands to the system.

12. The anomaly detection method of claim 11, further comprising during training of the anomaly detector, learning a dictionary comprising extremum values of the set of first values.

13. The anomaly detection method of claim 12, further comprising:
  generating a predetermined convex subspace in the latent space based on the set of first values and the dictionary, wherein a boundary of the predetermined convex subspace is determined based on the extremum values of the set of first values; and
  detecting the anomaly in the current operation of the system when at least one encoded query of the encoded set of queries is outside the predetermined convex subspace of the latent space.

14. The anomaly detection method of claim 11, further comprising:
  Encoding each key of the set of keys into a respective first value of the set of first values into the latent space during training of the anomaly detector; and
  storing the set of keys and the set of first values into the memory.

15. The anomaly detection method of claim 11, further comprising transmitting a first extended state of the sequence of extended states for a first control step of the plurality of control steps of the current operation of the system as a first query of the set of queries to the attention model.

16. The anomaly detection method of claim 15, further comprising comparing the first query with a first key of the set of keys for the first control step, wherein the first key is associated with the normal operation of the system for the first control step.

17. The anomaly detector of claim 11, wherein the attention model is based on a multi-headed attention mechanism, and wherein the at least one processor is further configured to encode the set of queries into the latent space based on the multi-headed attention mechanism.

18. A non-transitory computer-readable medium having stored thereon computer-executable instructions, which when executed by a computer, cause the computer to execute operations, the operations comprising:

- collecting a feedforward signal indicative of a sequence of control inputs to a plurality of actuators at a plurality of control steps;
- collecting a feedback signal sensed by at least one sensor and indicative of a sequence of outputs of a system caused by the plurality of actuators operated based on the sequence of control inputs at corresponding control steps of the plurality of control steps;
- combining input state variables extracted from the feedforward signal and output state variables extracted from the feedback signal to form a sequence of extended states of the system;
- transmitting the sequence of extended states as a set of queries to an attention model,
  - wherein each extended state of the sequence of extended states corresponds to a respective query of the set of queries to the attention model, and
  - wherein the attention model is configured to:
    - compare each of the transmitted set of queries with a set of keys to produce a plurality of attention weights; and
    - encode each of the set of queries as a weighted linear combination of a set of first values weighted with a corresponding attention weight of the plurality of attention weights to produce an encoding of each extended state of the sequence of extended states in a latent space,
  - wherein each key of the set of keys is associated with a normal extended state of a normal operation of the system,
  - wherein each first value of the set of first values is an encoding of a corresponding key of the set of keys into the latent space,
  - wherein each attention weight of the plurality of attention weights is produced by comparing a plurality of first entities of a query of the set of queries with a plurality of second entities of a key of the set of keys in their respective states by combining the similarity distances between a first entity of the plurality of first entities and a corresponding second entity of the plurality of second entities, and
  - wherein the similarity distance for comparing the first entity and the second entity is obtained from a mathematical space used to describe the first entity and the second entity;
- detecting an anomaly in a current operation of the system based on the encoded set of queries;
- generating a result of the anomaly detection; and
- generating control commands based on the result of the anomaly detection and transmitting the control commands to the system.

* * * * *